United States Patent
Morais (10) Patent No.: US 8,718,205 B1
(45) Date of Patent: May 6, 2014

(54) HARD AND SOFT BIT DEMAPPING FOR QAM NON-SQUARE CONSTELLATIONS

(71) Applicant: Douglas Howard Morais, San Mateo, CA (US)

(72) Inventor: Douglas Howard Morais, San Mateo, CA (US)

( * ) Notice: Subject to any disclaimer, the term of this patent is extended or adjusted under 35 U.S.C. 154(b) by 0 days.

(21) Appl. No.: 13/935,083

(22) Filed: Jul. 3, 2013

Related U.S. Application Data (60) Provisional application No. 61/854,736, filed on Apr. 30, 2013.

(51) Int. Cl.
  *H04L 27/06* (2006.01)
  *H04L 5/12* (2006.01)
  *H04W 4/00* (2009.01)

(52) U.S. Cl.
  USPC ............................ 375/341; 375/261; 370/329

(58) Field of Classification Search
  USPC .................................. 375/341, 261; 370/329
  See application file for complete search history.

(56) References Cited

U.S. PATENT DOCUMENTS

| | | | | |
|---|---|---|---|---|
| 5,533,033 A | * | 7/1996 | Ratner | 714/746 |
| 5,739,807 A | * | 4/1998 | Thong | 345/440.1 |
| 6,201,841 B1 | * | 3/2001 | Iwamatsu et al. | 375/346 |
| 6,288,631 B1 | * | 9/2001 | Shinozaki et al. | 375/260 |
| 6,584,144 B2 | * | 6/2003 | Alamouti et al. | 375/147 |
| 2001/0028630 A1 | * | 10/2001 | Burshtein et al. | 370/207 |
| 2001/0036274 A1 | * | 11/2001 | Antoine | 380/268 |
| 2002/0031190 A1 | * | 3/2002 | Ophir et al. | 375/265 |
| 2002/0114379 A1 | * | 8/2002 | Uesugi et al. | 375/219 |
| 2003/0123582 A1 | * | 7/2003 | Kim et al. | 375/347 |
| 2006/0029162 A1 | * | 2/2006 | Chi | 375/340 |

* cited by examiner

*Primary Examiner* — Leon-Viet Nguyen
*Assistant Examiner* — Sarah Hassan (57) ABSTRACT

Low complexity methods for hard and soft bit level demapping in a receiver of QAM signals with non-square, Gray coded constellations created as per U.S. Pat. No. 8,422,579 B1. In these methods the received signal is equalized to remove channel distortion, demodulated into in-phase and quadrature phase related symbols, and these symbols converted into hard-bits or preliminary soft-bits bits via the application of bit decision rules. Further, if converted into preliminary soft-bits, they may be multiplied by a factor to account for the impact of the received signal's signal-to-noise ratio on bit reliability, thereby creating final-soft-bits.

16 Claims, 9 Drawing Sheets

FIG. 5(a) $b_0$ ( = logical 1 in shaded area)

FIG. 5(c) $b_4$ ( = logical 1 in shaded area)

FIG. 5(b) $b_2$ ( = logical 1 in shaded area)

FIG. 6(a)

$b_1$ ( = logical 1 in shaded area)

FIG. 6(b)

$b_3$ ( = logical 1 in shaded area)

FIG. 7(a)

$b_0$ ( = logical 1 in shaded area)

FIG. 6(c)

$b_5$ ( = logical 1 in shaded area)

HARD AND SOFT BIT DEMAPPING FOR QAM NON-SQUARE CONSTELLATIONS

CROSS-REFERENCE TO RELATED APPLICATIONS

This application claims the benefit of my earlier filed Provisional Application No. 61/854,736, filed on Apr. 30, 2013.

STATEMENT REGARDING FEDERALLY SPONSORED RESEARCH AND DEVELOPMENT

Not applicable

BACKGROUND OF THE INVENTION

This invention is in the field of digital communication receivers and relates to hard and soft bit demapping of Quadrature Amplitude Modulation (QAM) signals employing non-square, Gray coded, constellations.

Recovery of modulating bits in a QAM receiver can be accomplished by symbol level demodulation followed by symbol to modulating bit sequence conversion or by direct bit level demapping. Bit level demapping can be such that the demapper output (information associated with the modulating bits) is 'hard', i.e., either a physical relative value of normally +1 unit, for a bit of logical value 1, or −1 unit for a bit of logical value 0. Alternatively, the demapper output can be 'soft', a soft-bit indicating how likely the modulating bit associated with a given demapper output is to be of logical value 1 or logical value 0. An example of soft-bits are log-likelihood ratios (LLRs), which have the same sign as that which would have been provided by a hard decision demapper, i.e., + or −, but whose magnitude indicates the level of confidence in that hard demapping decision.

If modulating bits are uncoded, the demapper output is always hard. If modulating bits are coded, via a convolution encoder, for example, the demapper output may be either hard or soft, as the decoder following the demapper can be made to operate either with hard input bits or with soft input bits. The decoder output, on the other hand, is always hard. In general, decoding via soft-bits is much more reliable than that via hard-bits.

In D. Morais U.S. Pat. No. 8,422,579 B1, dated Apr. 16, 2013 and entitled "Quadrature amplitude modulation via modified-square signal point constellation," new non-square, Gray coded, QAM constellations were introduced. These constellations exhibit a lower peak to average power ratio than their traditional square counterparts. For the traditional square, Gary coded, QAM constellations, low complexity methods exist for hard and soft level bit demapping, enhancing their utility. For the non-square, Gary coded, QAM constellations introduced in U.S. Pat. No. 8,422,579 B1, the availability of low complexity methods for hard and soft level bit demapping would similarly enhance their utility.

BRIEF SUMMARY OF THE INVENTION

This invention provides low complexity methods for hard and soft bit level demapping of QAM signals with non-square constellations created as per U.S. Pat. No. 8,422,579 B1. In these methods the received signal is equalized to remove channel distortion, demodulated into in-phase and quadrature phase related symbols, then these symbols are converted into hard-bits or preliminary soft-bits bits via the application of bit decision rules. These bit decision rules are created by a) for each bit in the modulating sequences used to create the constellation points, partitioning the constellation plane into defined regions, where the modulating bit value is either logical 1 or logical 0, and b) deducing, for each of the bits, a bit decision rule that is a function of the location of the in-phase and or quadrature demodulated symbol(s) in the partitioned constellation. In hard-bit demapping the rule leads to an output hard-bit which normally takes a physical value of +1 for the modulating bit likely being a logical 1, and a physical value of -1 for the modulating bit likely being a logical 0. In soft-bit demapping, the rule leads to an output preliminary soft-bit which takes a positive value for the modulating bit likely being a logical 1, a negative value for the modulating bit likely being a logical 0, with the magnitude of the value indicating the confidence in the decision of the bit being logical 1 or logical 0. Further, in the case where the received signal is a subcarrier of a multicarrier signal, preliminary soft-bits may be multiplied by a factor that is a function of the received signal's signal-to-noise ratio (SNR) to account for the impact of this ratio on the bit reliability.

DETAILED DESCRIPTION OF INVENTION

1) Exemplary system model

Figure 1:
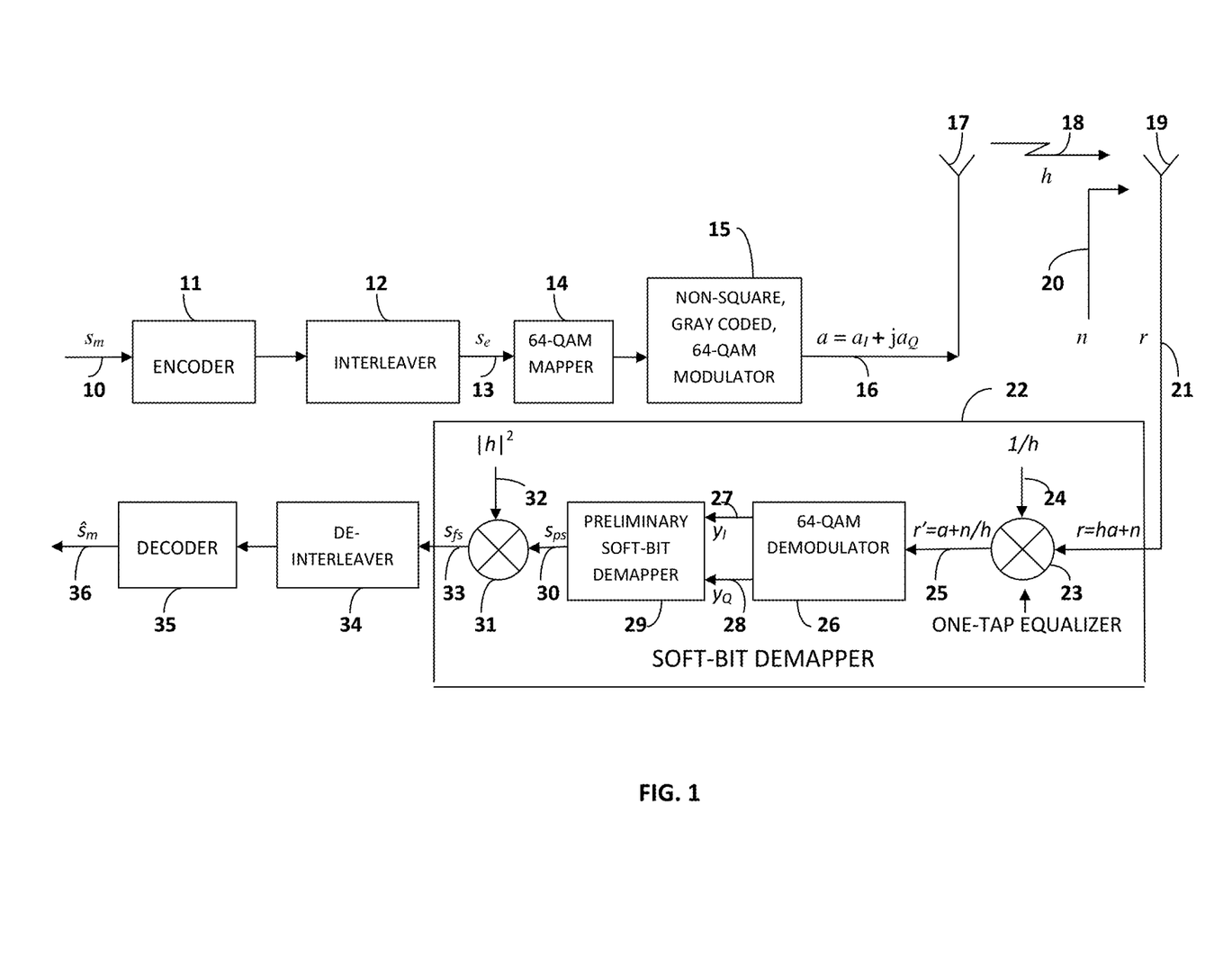
FIG. 1 is an exemplary system model for single subcarrier processing in a multicarrier transmitter/receiver system employing message sequence coding, non-square Gray coded 64-QAM modulation, and soft decision bit level demapping.

FIG. 1 shows an exemplary system model for single subcarrier processing in a multicarrier transmitter/receiver system employing message sequence coding, non-square Gray coded 64-QAM modulation as per U.S. Pat. No. 8,422,579 B1, and a soft-bit demapper 22 which is an embodiment of the present invention. At the transmitter, a binary uncoded message sequence $s_m$ 10 enters an encoder 11, which could be, for example, a convolution encoder or a turbo convolution encoder. The encoder 11 output feeds an interleaver 12. The interleaver 12 output, the sequence $s_e$ 13, feeds the 64-QAM mapper 14. The mapper 14 in turn feeds the non-square, Gray coded, 64-QAM modulator 15. In the modulator 15, each generated constellation signal point is driven by a unique sequence of 6 bits. For a given sequence of bits into the mapper 14, a QAM modulated signal $a=a_I+ja_Q$ 16 is created. Transmission of signal a 16 from the transmit antenna 17 to the receive antenna 19 over the wireless channel results in a 16 being multiplied by the channel frequency response h 17. Thus, the signal r 21 seen at the receiver input is given by r=ha+n, where n 20 is complex additive white Gaussian noise (AWGN).

Signal a 16 is normally up-converted in the transmitter to the desired RF transmission frequency and down-converted in the receiver prior the demodulation. To simplify system representation, up and down conversion is omitted in FIG. 1.

The channel response h 17 represents the gain and phase change encountered by signal a 16 as it traverses the wireless channel and it results in a scaling and rotation in the complex signal space to the original constellation exhibited by signal a 16. Signal r 21 is fed to the soft-bit demapper 22. In the soft-bit demapper 22 r 21 is fed to a multiplier 23. This multiplier 23 is also fed by 1/h 24, h having been estimated via an independent estimation procedure. The multiplication process in the multiplier 23 is referred to as one-tap equalization. The multiplier 23 outputs signal r' 25, where r'=r/h=a +n/h=a+ n', and where n', like n 20, is complex AWGN. The multiplication removes the scaling and rotation to signal a 16 introduced by h 18 but signal distortion due to additive noise 20 is still present in the form of n'. Signal r' 25 is fed to the 64-QAM demodulator 26 which outputs the in-phase related symbol $y_I$ 27 and quadrature related symbol $y_Q$ 28. Symbols)$2_1$ 27 and $y_Q$ 28 feed the preliminary soft-bit demapper 29 which outputs the preliminary soft bit sequence $s_{ps}$ 30. For single carrier systems, all symbols are affected on average, over a limited time, by the same SNR. For multicarrier systems such as OFDM, however, each individual subcarrier has its own SNR. Thus different symbols, though transmitted during the same symbol period, are affected by different SNRs. As bit reliability is a function of the received signal's SNR, then, in the case of multicarrier transmission, one technique to take advantage of this fact is to multiply the preliminary soft-bits by $|h|^2$, since $|h|^2$ is proportional to the subcarrier's SNR. The preliminary soft-bit demapper output $s_{ps}$ 30 feeds a multiplier 31 which is also fed by $|h|^2$ 32. This multiplication leads to the final soft-bits, sequence $s_{fs}$ 33. Sequence $s_{fs}$ 33, the output of the soft-bit demapper 22, feeds the de-interleaver 34 which in turn feeds the decoder 35, whose output is the hard-bit sequence $\hat{s}_m$ 36, the receiver's estimate of $s_m$ 10.

The system shown in FIG. 1 can be modified to accommodate hard decision bit level demapping by replacing the preliminary soft bit demapper 28 with a hard-bit demapper and feeding the hard-bit demapper output directly to the de-interleaver as the multiplication of the demapper output by $|h|^2$ is no longer applicable.

For a typical single carrier system where in the transmitter the message bits are encoded and interleaved and in the receiver demapping is soft-bit demapping, then FIG. 1 is still applicable, with the exception that there is no $|h|^2$ driven multiplier, as all symbols are affected on average, over a limited time, by the same SNR. Instead, the preliminary soft-bit demapper's output is fed directly to the de-interleaver.

2) Hard decision bit-level demapping

A detector that minimizes the probability of error in the presence of AWGN, where the various transmitted signals are equiprobable, is known as a maximum likelihood (ML) detector. Since a ML detector minimizes error probability, it is an optimum detector. In a ML detector, operating at the symbol level, the receiver computes the Euclidean distance of the received demodulated symbol from each of the positions that would be occupied by the full set of uncorrupted symbols and chooses as the transmitted symbol the symbol that is closest to the demodulated symbol. If a symbol is detected with a ML detector, then obviously the associated bits are detected. For QAM signals with 64 point constellations or higher ML symbol level detection is computationally demanding.

For a Gray coded 64-QAM constellation, a less computationally demanding alternative to bit determination via ML symbol detection is bit determination via hard decision bit level demapping. For a conventional square, Gray coded, 64-QAM constellation it is possible to carry out hard bit level demapping in a low complexity fashion while maintaining optimum error probability performance in the presence of AWGN via the method outlined in "Low complexity demodulator for M-ary QAM," by Hen-Geul Yeh and Hong-Seok Seo, Proc. of the 6$^{th}$ Wireless Telecommunications Symposium, 2007 (Non-Pat. Document 1). With this demapping method, the individual bit value (logical 1 or logical 0) in a modulating sequence is deduced by applying a bit decision rule. This rule is determined by first partitioning the constellation plane into defined regions where the modulating bit value is either logical 1 or logical 0, and then formulating the rule to indicate whether the modulating bit is likely of value logical 1 or logical 0 as a function of the location of the demodulated symbol in the partitioned constellation.

For the non-square, Gray coded, 64-QAM constellations introduced in U.S. Pat. No. 8,422,579 B1, it is not possible, in a low complexity fashion, to carry out hard bit level demapping while maintaining optimum error probability performance in the presence of AWGN. It is possible, however, to construct a sub-optimal, low complexity procedure that results in near optimal error probability performance.

The hard decision demapping method outlined in Non-Pat. Document 1 provides simple equations for application in a hard-bit demapper. Consider the square, Gary coded, 64-QAM constellation shown in FIG. 2. Here a six bit modulating sequence, $b_0$, $b_1$, $b_2$, $b_3$, $b_4$, $b_5$ generates a given signal point, where $b_0$, $b_2$ and $b_4$ represent the in-phase modulating bits, modulating the carrier along the real axis, and $b_1$, $b_3$ and $b_5$ represent the quadrature modulating bits, modulating the carrier along the imaginary axis. The constellation shown in FIG. 2 can be partitioned so that each bit of the six bit modulating sequence, when of logical value 1, is located in a defined region and, when of logical value 0, located in a defined region that is non-overlapping with the region defined for logical value 1. For this constellation, the in-phase bits are partitioned vertically while the quadrature bits are partitioned horizontally. Let $H_{I,1}$, $H_{I,2}$, and $H_{I,3}$ represent the demapped hard-bits corresponding to the in-phase modulating bits $b_0$, $b_2$, and $b_4$ respectively. Let $H_{Q,1}$, $H_{Q,2}$, and $H_{Q,3}$ represent the demapped hard-bits corresponding to the quadrature modulating bits $b_1$, $b_3$, and $b_5$ respectively. Then, for this constellation, equations for the recovered bits as per the method outlined in Non-Pat. Document 1 are given by:

$H_{I,1}$=−1, if $y_I$>0
=+1, otherwise
$H_{I,2}$=−1, if $|y_I|$<4
=+1, otherwise
$H_{I,3}$=−1, if $2<|y_I|<6$
=+1, otherwise
$H_{Q,1}$=−1, if $y_Q$>0
=+1, otherwise
$H_{Q,2}$=−1, if $|y_Q|$<4
=+1, otherwise
$H_{Q,3}$=−1, if $2<|y_Q|<6$
=+1, otherwise In an embodiment of the present invention, a hard decision demapping method is outlined to address the non-square, Gray coded, 64-QAM constellations introduced in U.S. Pat. No. 8,422,579 B1, examples of which are shown in FIGS. 3 and 4. These constellations are created by modifying the square, Gray coded, 64-QAM constellation shown in FIG. 2, here designated the parent constellation. In FIG. 3, the signal points 10 to 17 of the square matrix are relocated to points 10' to 17' respectively. Note that the modified constellation, originally Gray coded when a square, remains Gray coded. In FIG. 4, the signal points 10 to 17 of the square matrix are relocated to points 10" to 17" respectively. Note that, as with FIG. 3, the modified constellation, originally Gray coded when a square, remains Gray coded. These constellations have a peak-to-average power ratio (PAPR) approximately 1.2 dB lower than that of the standard square 64-QAM constellation while degrading receiver sensitivity relative to that of the standard square 64-QAM constellation by only approximately 0.3 dB.

Figure 2:
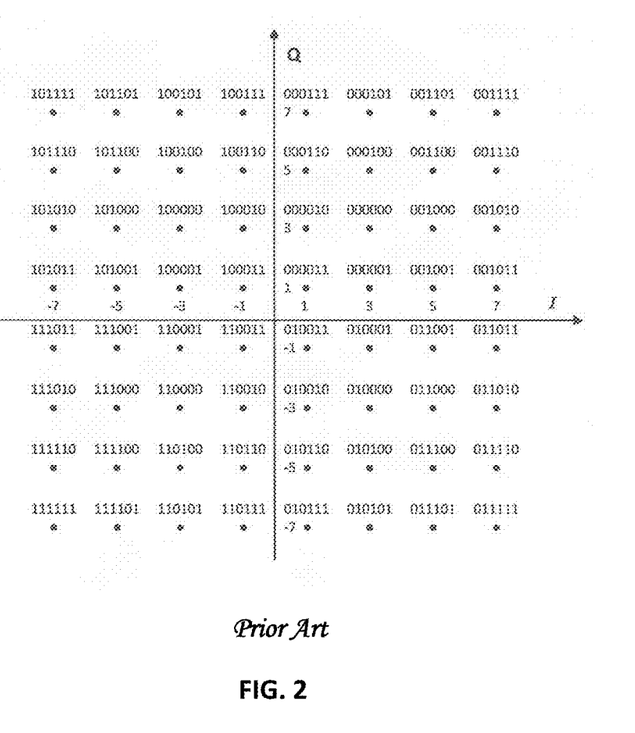
FIG. 2 is a prior art square, Gray coded, 64-QAM constellation.
Figure 3:
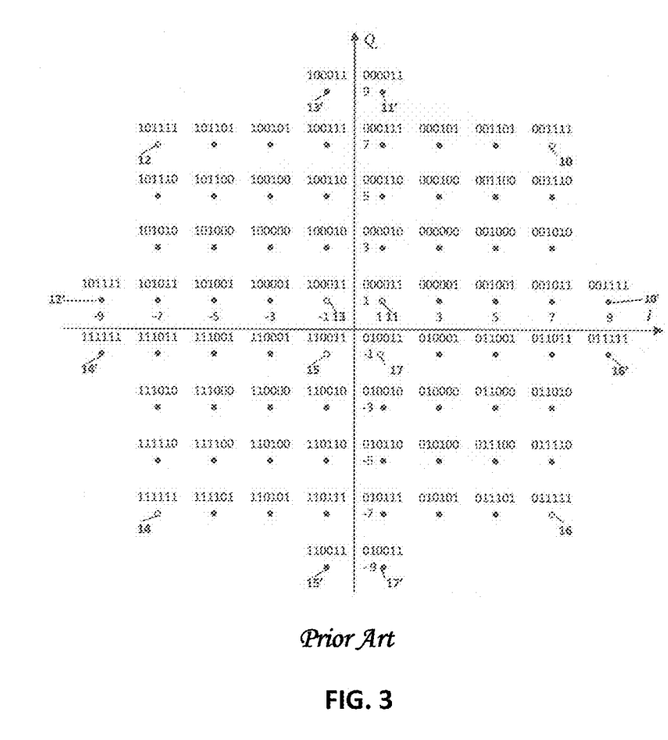
FIG. 3 is a prior art, non-square, Gray coded, 64-QAM constellation.
Figure 4:
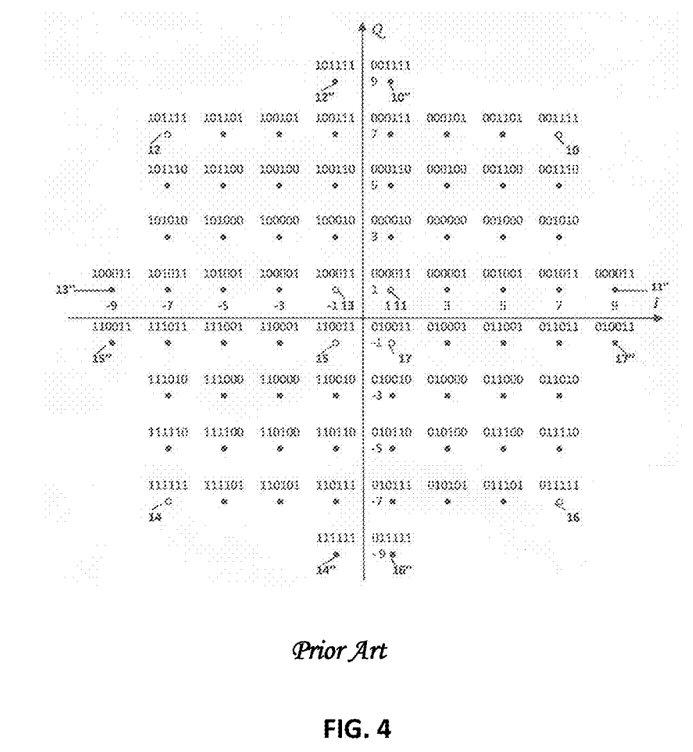
FIG. 4 is an alternate, prior art, non-square, Gray coded, 64-QAM constellation.
Figure 5A:
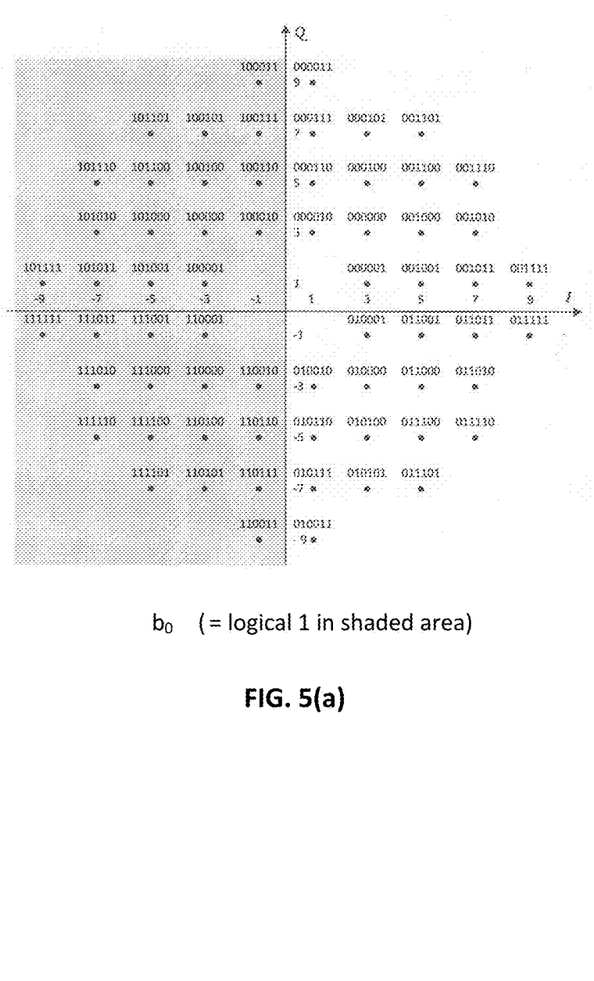
FIG. 5(a) is constellation partitioning for $b_0$ (the in-phase most significant bit, $b_{I,MSB}$) of the 64-QAM constellation shown in FIG. 3. This partitioning leads to equations for demapping hard-bit $H_{I,1}$ and preliminary soft-bit $S_{I,1}$.

By applying, for the constellation shown in FIG. 3, the constellation partitioning shown in FIGS. 5(a), 5(b), 5(c), 6(a), 6(b), and 6(c) for the bits $b_0$, $b_2$, $b_4$, $b_1$, $b_3$, and $b_5$ respectively, where $b_0$, $b_2$ and $b_4$ represent the in-phase modulating bits, $b_1$, $b_3$ and $b_5$ represent the quadrature modulating bits, and where the demapped hard-bits are designated as previously for the hard-bit demapping regarding FIG. 2, equations for all hard-bit values may be determined. For example, FIG. 5(a) shows that bit $b_0$ and hence $H_{I,1}$ is always of logical value 0 (physical value −1) to the right of the vertical axis, and of logical value 1 (physical value +1) to the left of the vertical axis. Thus, $H_{I,1}$ is given by:

$H_{I,1}$=−1, if $y_I$>0
=+1, otherwise

Figure 5B:
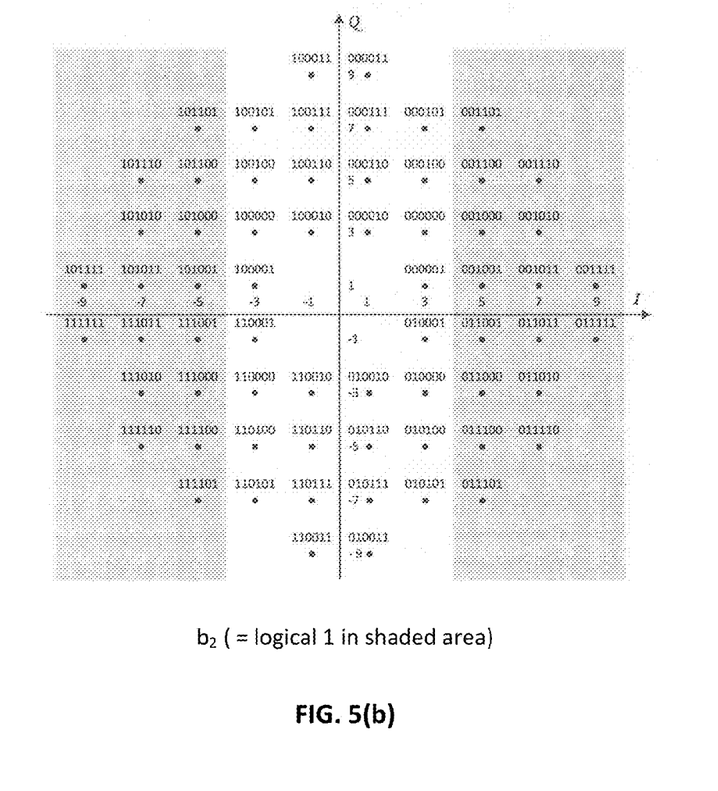
FIG. 5(b) is constellation partitioning for $b_2$ (the in-phase mid significant bit, $b_{I,MidSB}$) of the 64-QAM constellation shown in FIG. 3. This partitioning leads to equations for demapping hard-bit $H_{I,2}$ and preliminary soft-bit $S_{I,2}$.
Figure 5C:
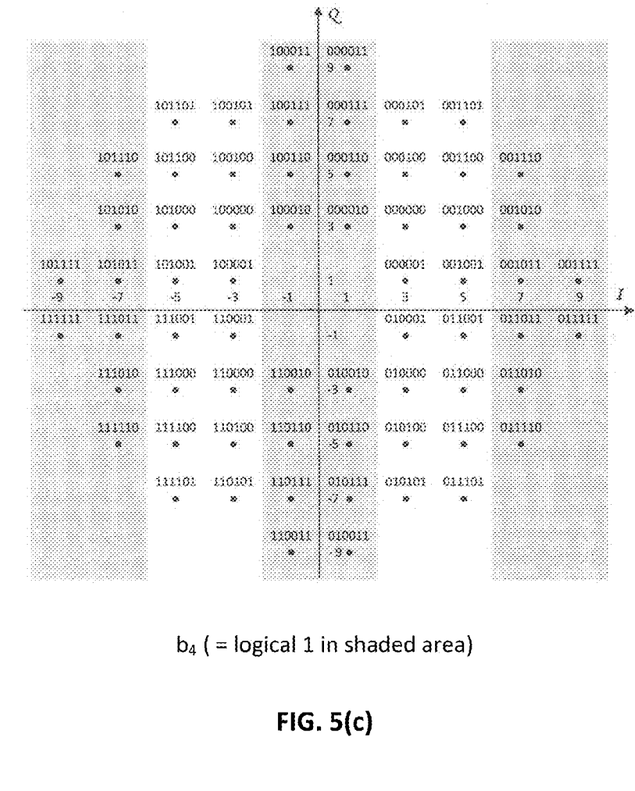
FIG. 5(c) is constellation partitioning for $b_4$ (the in-phase least significant bit, $b_{I,LSB}$) of the 64-QAM constellation shown in FIG. 3. This partitioning leads to equations for demapping hard-bit $H_{I,3}$ and preliminary soft-bit $S_{I,3}$.
Figure 6A:
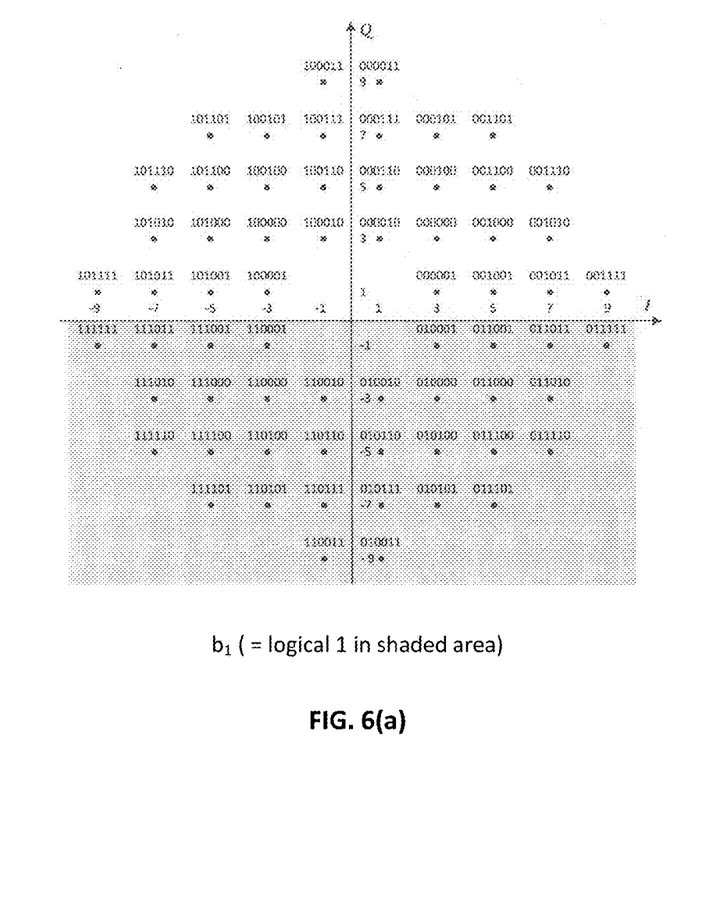
FIG. 6(a) is constellation partitioning for $b_1$ (the quadrature phase most significant bit, $b_{Q,MSB}$) of the 64-QAM constellation shown in FIG. 3. This partitioning leads to equations for demapping hard-bit $H_{Q,1}$ and preliminary soft-bit $S_{Q,2}$.
Figure 6B:
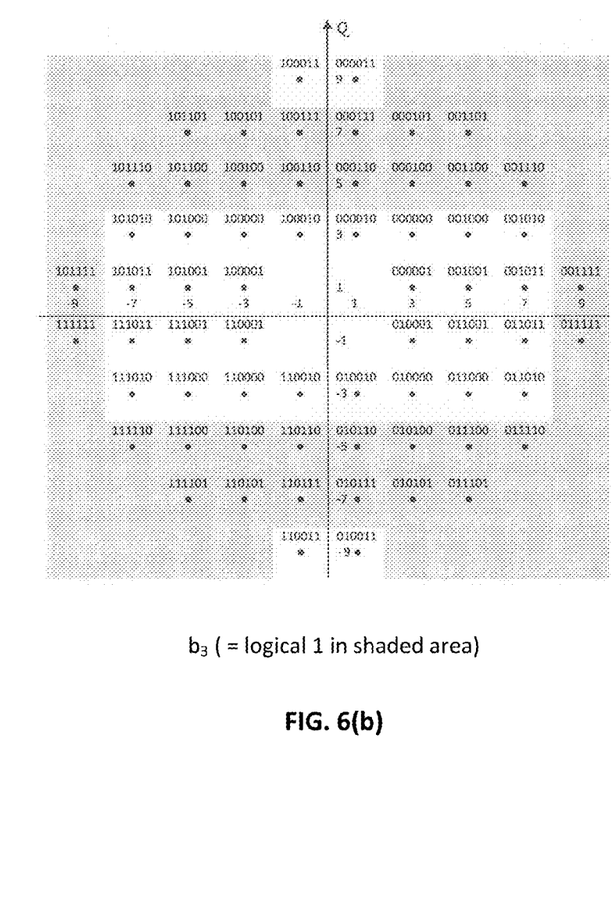
FIG. 6(b) is constellation partitioning for $b_3$ (the quadrature phase mid significant bit, $b_{Q,MSB}$) of the 64-QAM constellation shown in FIG. 3. This partitioning leads to equations for demapping hard-bit $H_{Q,2}$ and preliminary soft-bit $S_{Q,2}$.

With the partitioning shown in FIGS. 5(a), 5(b), 5(c), 6(a), 6(b), and 6(c), equations for all hard-bit values remain the same as those given above for the square parent constellation of FIG. 2 with the exception of that for $H_{Q,2}$. Here the relevant partitioning is that for $b_3$ as shown in FIG. 6(b). Note that, for this bit of the sequence only, partitioning lines are vertical as well as horizontal. As a result, the equation for $H_{Q,2}$, unlike the rest, is a function of both $y_I$ and $y_Q$, and is given by:

$H_{Q,2}$=−1, if $|y_I|$<8, $|y_Q|$<4
=+1, if $|y_I|$<2, $|y_Q|$>8
=+1, otherwise As with FIG. 3, by applying, for the constellation shown in FIG. 4, the constellation partitioning shown in FIGS. 7(a), 7(b), 7(c), 8(a), 8(b), and 8(c) for the bits $b_0$, $b_2$, $b_4$, $b_1$, $b_3$, and $b_5$ respectively, where $b_0$, $b_2$ and $b_4$ represent the in-phase modulating bits, $b_1$, $b_3$ and $b_5$ represent the quadrature modulating bits, and where the demapped hard-bits are designated as previously for the hard-bit demapping regarding FIG. 2, equations for all hard-bit values may be determined. With this partitioning, equations for all demapped hard-bit values remain the same as for the square parent constellation of FIG. 2 with the exception that that for $H_{I,2}$ becomes:

$H_{I,2}$=−1, if $|y_Q|$<8, $|y_I|$<4
=+1, if $|y_Q|$<2, $|y_I|$>8
=+1, otherwise With optimal detection, the probability of bit error in the presence of AWGN, $P_{be(opt)}$ say, of a 64-QAM received signal with a non-square, Gary coded constellation as shown in either FIG. 3 or 4 has been calculated and confirmed by computer simulation to be given by:

$$P_{be(opt)} = \frac{13}{24} Q\left[\sqrt{\frac{6}{23}\frac{S}{N_b}}\right] \qquad \text{Eq. 1}$$

where S is the received signal power, and $N_b$ is the received AWGN in the bit rate bandwidth. For detection via bit level demapping as described above, however, the probability of bit error in the presence of AWGN, $P_{be(sub-opt)}$ say, of this same signal is, as indicated earlier, sub-optimal, and has been calculated and confirmed by computer simulation to be given by:

$$P_{be(sub-opt)} = \frac{15}{24} Q\left[\sqrt{\frac{6}{23}\frac{S}{N_b}}\right] \qquad \text{Eq. 2}$$

From Eqs. 1 and 2 it can be shown that for a probability of bit error of $10^{-4}$ the increase in S/$N_b$ for sub-optimal versus optimal detection is less than 0.1 dB. Thus, though sub-optimal, the bit level demapping method introduced above performs, from a practical point of view, essentially the same as an optimal one.

Figure 6C:
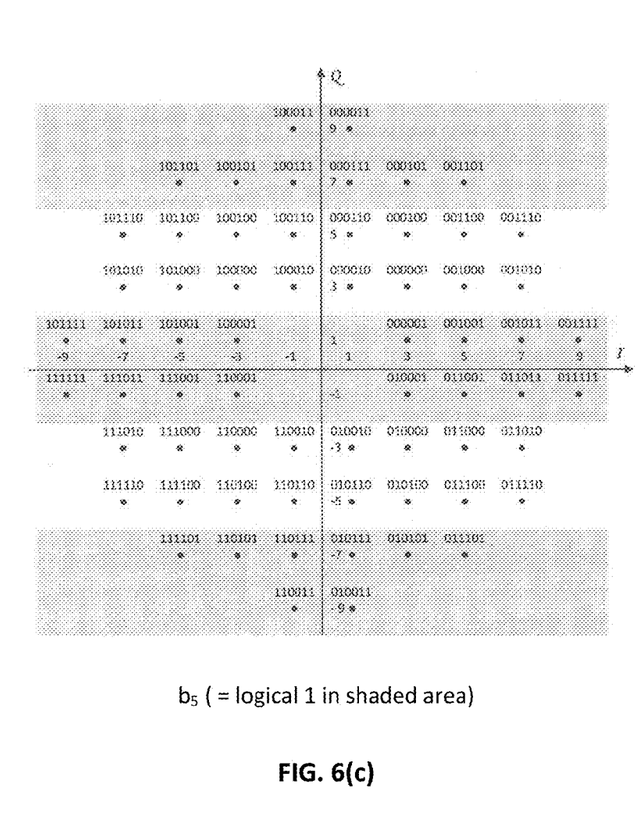
FIG. 6(c) is constellation partitioning for $b_5$ (the quadrature phase least significant bit, $b_{Q,LSB}$) of the 64-QAM constellation shown in FIG. 3. This partitioning leads to equations for demapping hard-bit $H_{Q,3}$ and preliminary soft-bit $S_{Q,3}$.

The methods of hard bit demapping outlined above for the constellations shown in FIGS. 3 and 4 are applicable to all non-square, Gray coded, 64-QAM constellations created as per the methods outlined in U.S. Pat. No. 8,422,579 B1. However, in order apply these methods generally, it is helpful to uniquely label each bit in the 6 bit modulating sequence that results in the non-square, Gray coded constellation. In the square parent constellation, Gray coding is achieved by applying the 3 in-phase modulating bits in a Gray coded sequence and the 3 quadrature modulating bits in a Gray coded sequence. In a Gray coded sequence of bits, the bit that alternates least frequently is labeled the most significant bit (MSB), and the bit that alternates most frequently is labeled the least significant bit alternates (LSB). Applying this nomenclature approach, let the in-phase (quadrature) modulating bit, that in the square parent constellation alternates in value once as it traverses parallel to the I (Q) axis from one end to the other, be labeled the most significant bit $b_{I,MSB}$ ($b_{Q,MSB}$). Let the in-phase (quadrature) modulating bit, that in the square parent constellation alternates in value twice as it traverses parallel to the I (Q) axis from one end to the other, be labeled the mid significant bit $b_{I,MidSB}$ ($b_{Q,MidSB}$). Let the in-phase (quadrature) modulating bit, that in the square parent constellation alternates in value four times as it traverses parallel to the I (Q) axis from one end to the other, be labeled the least significant bit $b_{I,LSB}$ ($b_{Q,LSB}$). Applying these modulating bit labels to the constellation of FIG. 3, $b_0$, $b_2$, and $b_4$ represent $b_{I,MSB}$, $b_{I,MidSB}$, and $b_{I,LSB}$ respectively, with FIGS. 5(a), 5(b), and 5(c) representing the applicable partitioning respectively. Similarly, $b_1$, $b_3$, and $b_5$ represent $b_{Q,MSB}$, $b_{Q,MidSB}$, and $b_{Q,LSB}$ respectively, with FIGS. 6(a), 6(b), and 6(c) representing the applicable partitioning respectively. However, as indicated above, all versions of Gray coding are applicable. Thus, for example, one could have $b_0$, $b_1$, and $b_2$ represent $b_{I,MSB}$, $b_{I,MidSB}$, and $b_{I,LSB}$ respectively and $b_3$, $b_4$, and $b_5$ represent $b_{Q,MSB}$, $b_{Q,MidSB}$, and $b_{Q,LSB}$ respectively. Further, one could have, for example, $b_0$, $b_1$, and $b_2$ represent $b_{I,LSB}$, $_{I,MidSB}$, and $b_{I,MSB}$ respectively, and $b_3$, $b_4$, and $b_5$ represent $b_{Q,LSB}$, $b_{Q,MidSB}$, and $b_{Q,MSB}$ respectively. Additionally, though each partitioning shown indicates a logical value of 1 in the shaded area, the modulation could clearly be structured so that the shaded area represents a logical value of 0. To use the partitioning shown in FIGS. 5(a), 5(b), 5(c), 6(a), 6(b), and 6(c), all that is required is to match each of the three in-phase modulating bits in the sequence, ie., $b_{I,MSB}$, $b_{I,MidSB}$, and $b_{I,LSB}$, regardless of their location in the sequence, to the partitioning shown in FIGS. 5(a), 5(b), and 5(c) respectively and to match each of the three quadrature modulating bits in the sequence, i.e., $b_{Q,MSB}$, $b_{Q,MidSB}$, and, $b_{Q,LSB}$, regardless of their location in the sequence, to the partitioning shown in FIGS. 6(a), 6(b), and 6(c) respectively, where for any of the partitionings, the shaded area may represent a logical bit value of 1 or 0 as dictated by the specifics of the coding.

The same flexibility indicated above applies to the matching of the six bit modulating sequence to partitioning shown in FIGS. 7(a), 7(b), 7(c), 8(a), 8(b), and 8(c) when the non-square, Gray coded, 64-QAM constellation is created in the same fashion as that in FIG. 4.

Figure 7A:
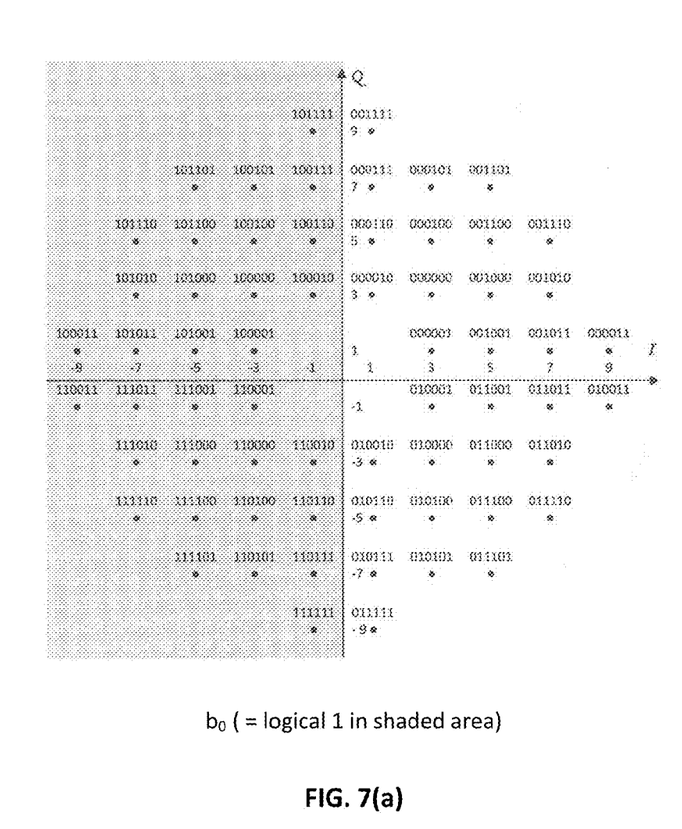
FIG. 7(a) is constellation partitioning for $b_0$ (the in-phase most significant bit, $b_{I,MSB}$) of the 64-QAM constellation shown in FIG. 4. This partitioning leads to equations for demapping hard-bit $H_{I,1}$ and preliminary soft-bit $S_{I,1}$.
Figure 7B:
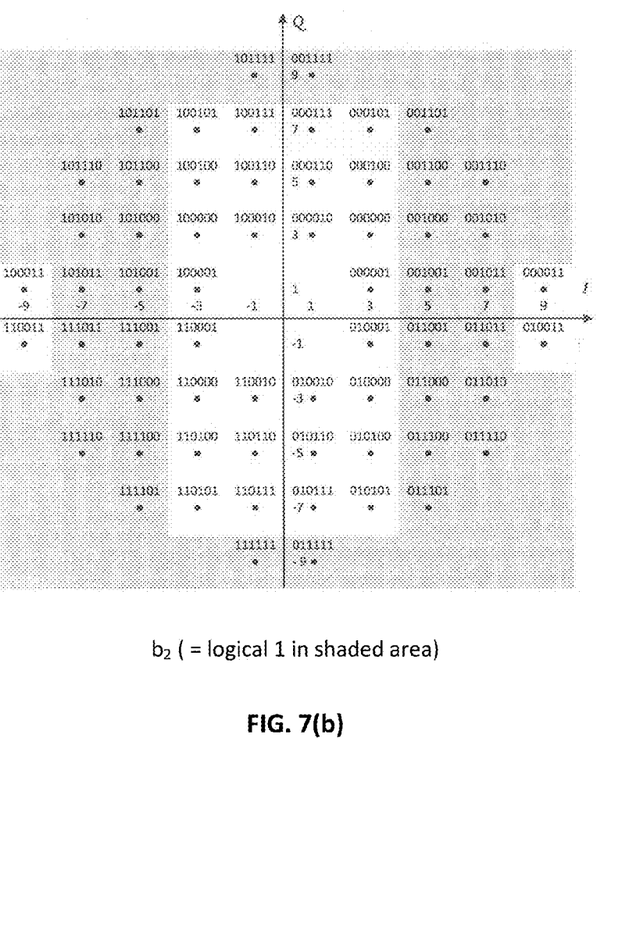
FIG. 7(b) is constellation partitioning for $b_2$ (the in-phase mid significant bit, $b_{I,MidSB}$) of the 64-QAM constellation shown in FIG. 4. This partitioning leads to equations for demapping hard-bit $H_{I,2}$ and preliminary soft-bit $S_{I,2}$.
Figure 7C:
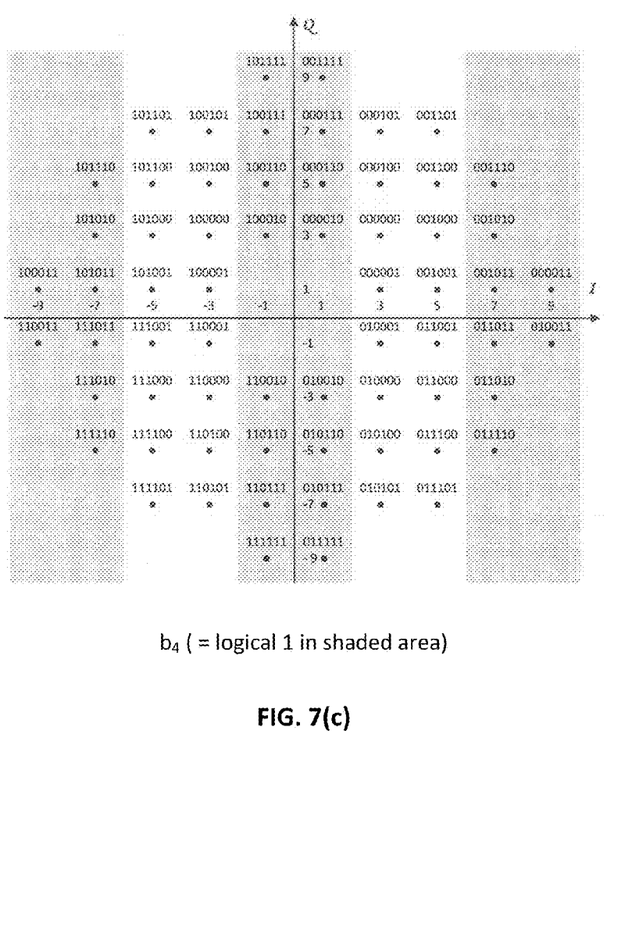
FIG. 7(c) is constellation partitioning for $b_4$ (the in-phase least significant bit, $b_{I,LSB}$) of the 64-QAM constellation shown in FIG. 4. This partitioning leads to equations for demapping hard-bit $H_{I,3}$ and preliminary soft-bit $S_{I,3}$.
Figure 8A:
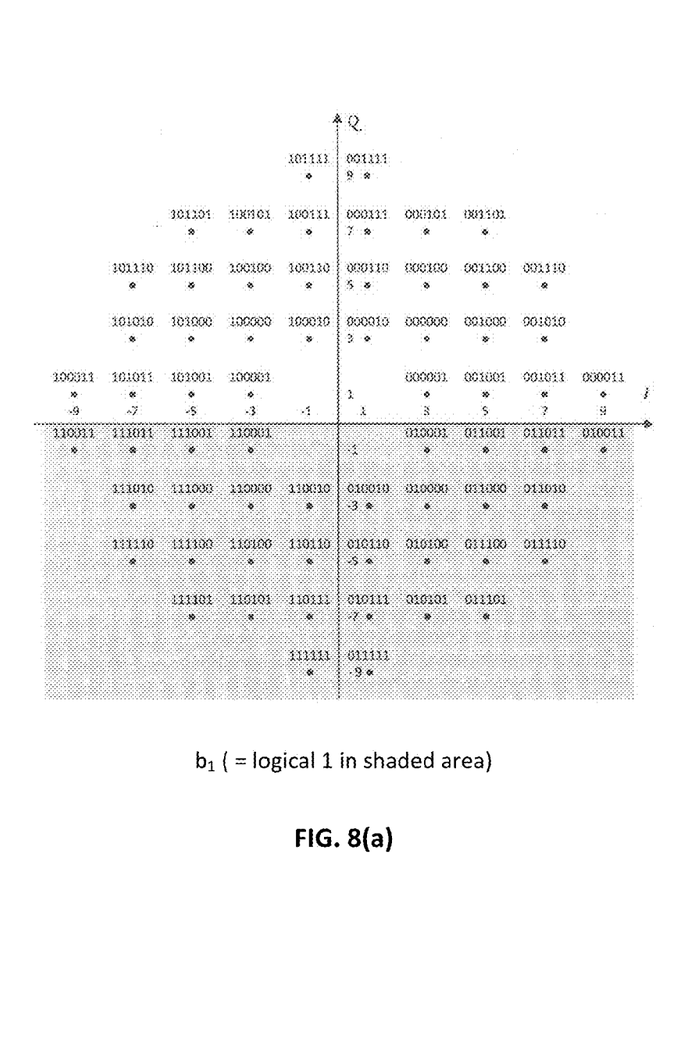
FIG. 8(a) is constellation partitioning for $b_1$ (the quadrature phase most significant bit, $b_{Q,MSB}$) of the 64-QAM constellation shown in FIG. 4. This partitioning leads to equations for demapping hard-bit $H_{Q,1}$ and preliminary soft-bit $S_{Q,1}$.
Figure 8B:
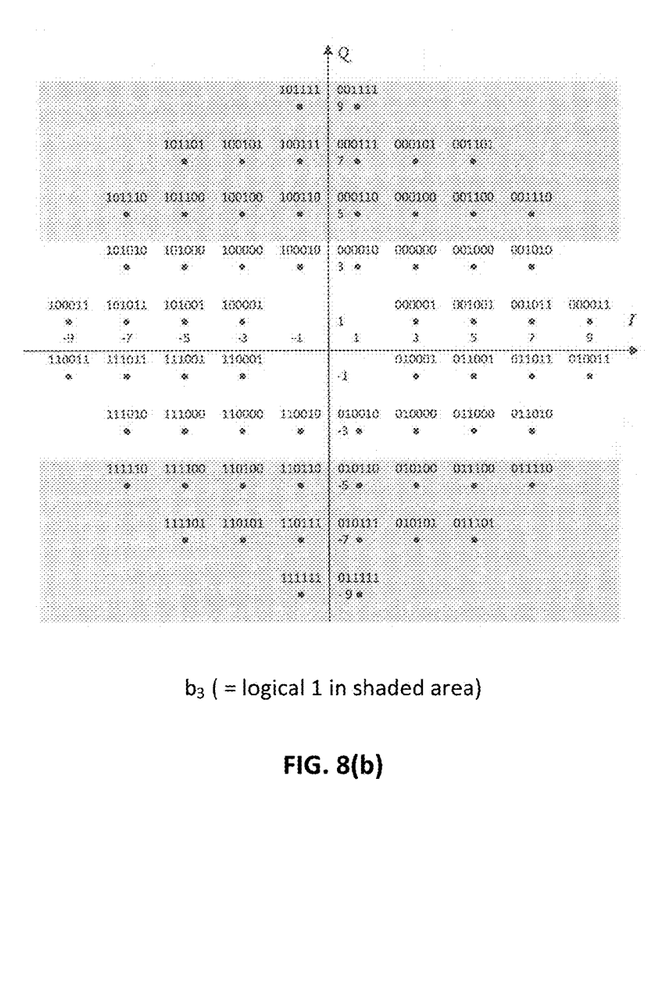
FIG. 8(b) is constellation partitioning for $b_3$ (the quadrature phase mid significant bit, $b_{Q,MidSB}$) of the 64-QAM constellation shown in FIG. 4. This partitioning leads to equations for demapping hard-bit $H_{Q,2}$ and preliminary soft-bit $S_{Q,2}$.
Figure 8C:
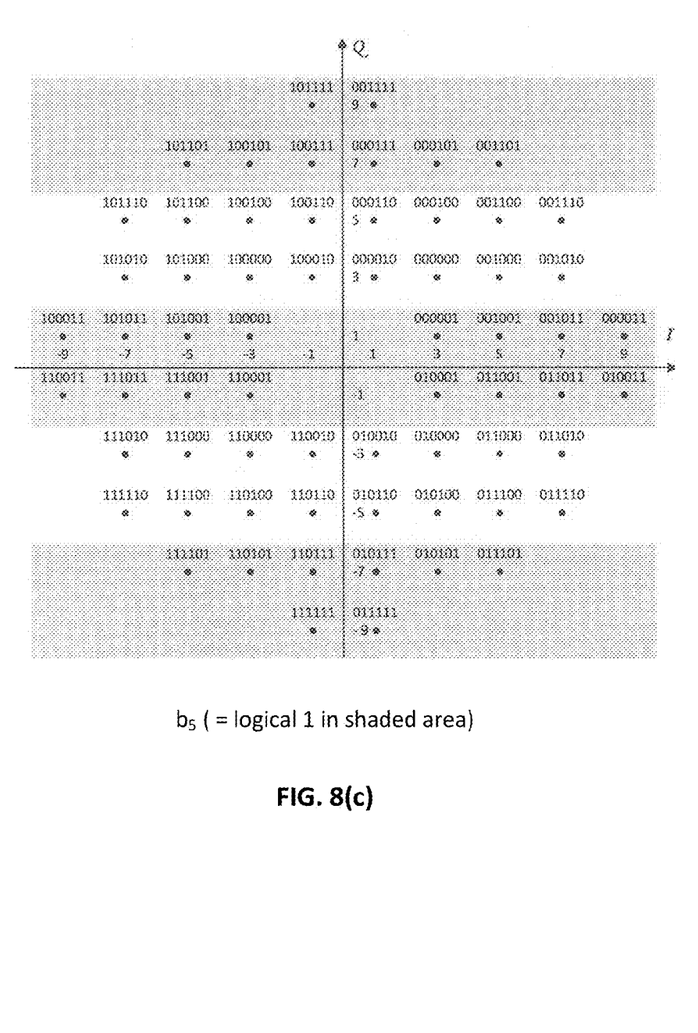
FIG. 8(c) is constellation partitioning for $b_5$ (the quadrature phase least significant bit, $b_{Q,LSB}$) of the 64-QAM constellation shown in FIG. 4. This partitioning leads to equations for demapping hard-bit $H_{Q,3}$ and preliminary soft-bit $S_{Q,3}$.
Figure 9:
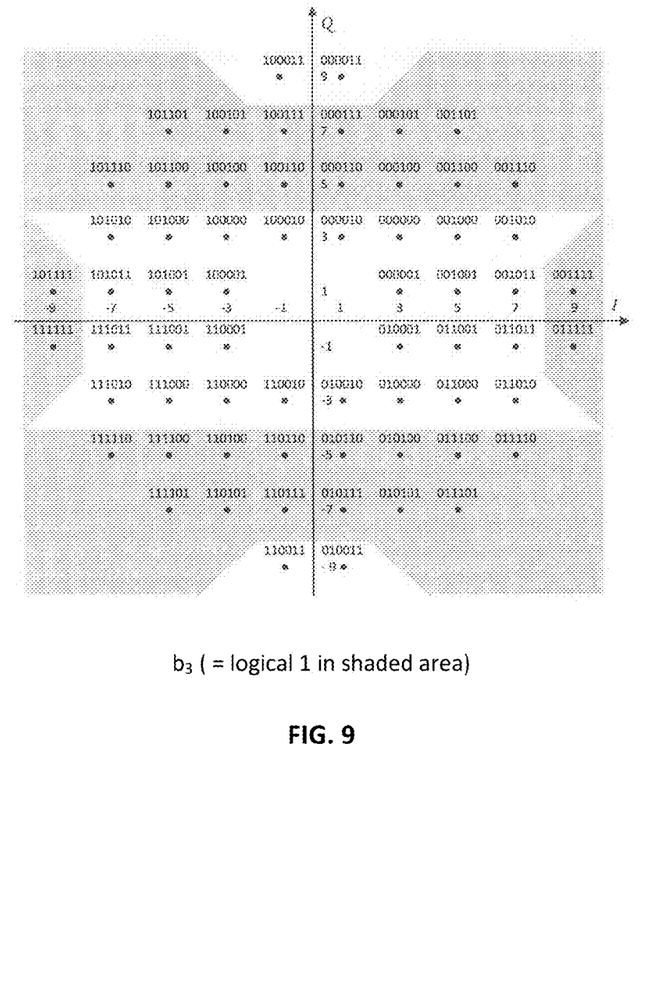
FIG. 9 is an alternate constellation partitioning for $b_3$ (the quadrature phase mid significant bit, $b_{Q,MidSB}$) of the 64-QAM constellation shown in FIG. 3. This partitioning leads to equations for demapping hard-bit $H_{Q,2}$ and preliminary soft-bit $S_{Q,2}$.

It should be noted that the partitioning shown in FIG. 6(b) for bit $b_3$ of the constellation shown in FIG. 3 and that shown in FIG. 7(b) for bit $b_2$ of the constellation shown in FIG. 4 are exemplary embodiments of the invention and that other partitioning is possible. For example, bit $b_3$ of the constellation shown in FIG. 3 can be partitioned as shown in FIG. 9 and bit $b_2$ of the constellation shown in FIG. 4 can be partitioned as shown in FIG. 9 but with the partitioning rotated by 90 degrees. In fact, hard-bit demapping using decision equations based on these latter partitionings results in probability of bit error performance in the presence of AWGN, $P_{be(sub-opt2)}$ say, that has been calculated to be given by:

$$P_{be(sub-opt2)} = \frac{29}{48} Q\left[\sqrt{\frac{6}{23}\frac{S}{N_b}}\right] \quad \text{Eq. 3}$$

This performance is only very slightly better than that afforded via partitioning based on FIGS. 6(b) and 7(b) but comes at the expense of increased computational complexity.

3) Soft decision bit-level demapping

A method of demapping Gray coded square constellation QAM signals based on generating LLR soft bit values is given in "Simplified Soft-Output Demapper for Binary Interleaved COFDM with Applications to HIPERLAN/2," by Tosato and Bisaglia, IEEE International Conference on Communications, Proceedings, Vol. 2, pp. 664-668, 2002 (Non-Pat. Document 2). This method provides simple equations for generating preliminary soft-bits. For the square, Gray coded, 64-QAM constellation shown in FIG. 2, where a six bit modulating sequence, $b_0$, $b_1$, $b_2$, $b_3$, $b_4$, $b_5$ generates a given signal point, and where $b_0$, $b_2$ and $b_4$ represent the in-phase bits and $b_1$, $b_3$ and $b_5$ represent the quadrature bits, let $S_{I,1}$, $S_{I,2}$, and $S_{I,3}$ represent the demapped preliminary soft-bits corresponding to in-phase modulating bits $b_0$, $b_2$, and $b_4$ respectively, and let $S_{Q,1}$, $S_{Q,2}$, and $S_{Q,3}$ represent the demapped preliminary soft-bits corresponding to quadrature modulating bits $b_1$, $b_3$, and $b_5$ respectively. With this method, constellation partitioning is identical to that outlined in Non-Patent Document 1 and approximate equations for the preliminary in-phase soft-bits are given by:

$S_{I,1} = -y_I$
$S_{I,2} = |y_I| - 4$
$S_{I,3} = ||y_I| - 4| - 2 = |S_{I,2}| - 2$
$S_{Q,1} = -y_Q$
$S_{Q,2} = |y_Q| - 4$
$S_{Q,3} = ||y_Q| - 4| - 2 = |S_{Q,2}| - 2$

Further, it is noted in Non-Patent Document 2 that these approximate equations correspond to calculating $|S_{I,k}|(|S_{Q,k}|)$, where k=1,2, and 3, as the distance of the received equalized and demodulated signal $y_I$ ($y_e$) from the nearest partition boundary and assigning to $S_{I,k}$ ($S_{Q,k}$) the sign + or − according to which partition $y_I$ ($y_Q$) falls in. Though approximations, computer simulations reported in Non-Patent Document 2 show no BER versus $S/N_b$ performance degradation from the theoretical when final soft-bits are the preliminary soft bits stated above multiplied by $|h|^2$, h being the channel response.

In an embodiment of the present invention, a soft decision demapping method is outlined to address non-square, the Gray coded, 64-QAM constellations introduced in U.S. Pat. No. 8,422,579 B1, examples of which are shown in FIGS. 3 and 4.

By applying, for the constellation shown in FIG. 3, the constellation partitioning shown in FIGS. 5(a), 5(b), 5(c), 6(a), 6(b), and 6(c) for the bits $b_0$, $b_2$, $b_4$, $b_1$, $b_3$, and $b_5$ respectively, where $b_0$, $b_2$ and $b_4$ represent the in-phase modulating bits, $b_1$, $b_3$ and $b_5$ represent the quadrature modulating bits, and where the preliminary soft-bits are designated as previously for the preliminary soft-bits regarding FIG. 2, equations for all preliminary soft-bit values remain the same as those given above for the square constellation of FIG. 2 with the exception that that for $S_{Q,2}$ becomes:

$S_{Q,2} = 2 - ||y_Q| - 6|, |y_I| < 2$
$= |y_Q| - 4, 2 \le |y_I| < 8$
$= |y_I| - 8, |y_I| \ge 8$

By applying, for the constellation shown in FIG. 4, the constellation partitioning shown in FIGS. 7(a), 7(b), 7(c), 8(a), 8(b), and 8(c) for the bits $170_0$, $b_2$, $b_4$, $b_1$, $b_3$, and $b_5$ respectively, where $b_0$, $b_2$ and $b_4$ represent the in-phase modulating bits, $b_1$, $b_3$ and $b_5$ represent the quadrature modulating bits, and where the preliminary soft-bits are designated as previously for the preliminary soft-bits regarding FIG. 2, equations for all preliminary soft-bit values remain the same as for the square constellation of FIG. 2 with the exception that that for $S_{I,2}$ becomes:

$S_{I,2} = 2-|y_1|-6|, |y_Q|<2$
$= |y_I|-4, 2 \le |y_Q| \ge 8$
$= |y_Q|-8$

As with the method of hard-bit demapping introduced above, the general partitioning approach is applicable to all non-square, Gray coded, 64-QAM constellations created in the same fashion as FIG. 3 or 4.

The hard and soft bit demapping methods outlined above, though demonstrated via Gray coded, 64-QAM, non-square constellations, can be applied to the Gray coded, 256-QAM, non-square constellations introduced in U.S. Pat. No. 8,422,579 B1. Accordingly, the scope of the present invention is to be defined to include hard and soft demapping of the Gray coded, 256-QAM, non-square constellations introduced in U.S. Pat. No. 8,422,579 B1.

Although the present invention has been described with respect to specific exemplary embodiments, it should be understood that various changes and modifications to these embodiments may become apparent to those skilled in the art once the above disclosure is fully comprehended. It is intended that the following claims be interpreted to include all such variations and modifications.

What is claimed is:

1. A method of hard bit level and soft bit level demapping in a receiver wherein a received signal was modulated in a transmitter by mapping a different 6 bit modulating data sequence to each of 64 constellation points to create a non-square, Gray coded, QAM signal point constellation, the method of hard bit level and soft bit level demapping comprising:

equalizing said received signal to remove channel distortion from said received signal thereby creating an equalized signal;

demodulating said equalized signal into an in-phase related symbol $y_I$ and a quadrature phase related symbol $y_Q$; and demapping said in-phase related symbol $y_I$ and said quadrature related symbol $y_Q$ into hard-bits or preliminary soft-bits by applying, for each of the 6 bits in the modulating sequence, a bit decision rule, the bit decision rule for a given bit determined by first partitioning the constellation plane into defined regions, where, in each region, the given bit value is either logical 1 or logical 0, then deducing the bit decision rule, where said bit decision rule is a function of the location of $y_I$ and or $y_Q$ in the given bit's partitioned constellation plane and declares a) whether the given bit is likely of value logical 1 or logical 0, and b) in the case of soft bit level demapping, the degree of confidence in the decision that the given bit is likely logical 1 or logical 0; and, optionally multiplying, in the case of soft bit level demapping, said preliminary soft-bits by a factor that is a function of said received signal's signal-to-noise ratio (SNR), thereby creating final soft-bits; and where the said non-square, Gray coded, QAM signal point constellation is the same as that created by modifying a square, Gray coded, QAM signal point parent constellation comprising 64 points, arranged with 16 points in each of four quadrants defined by I and Q axes intersecting at an origin of a phase-plane diagram, the signal points in each quadrant of the square array having I and Q relative component amplitudes of 1, 3, 5, and 7 units, the square, Gray coded, 64-QAM parent constellation being modified by eliminating an inner most 4 constellation points located at the complex positions $1+1j$, $-1+1j$, $-1-1j$ and $1-1j$, replacing the inner most 4 constellation points with new constellation points, located at complex positions $1+9j$, $-1+9j$, $-1-9j$ and $1-9j$, respectively, eliminating an outer most 4 constellation points, located at the complex positions $7+7j$, $-7+7j$, $-7-7j$ and $-7j$, replacing the outer most 4 constellation points with new constellation points located at the complex positions $9+1j$, $-9+1j$, $-9-1j$ and $9-1j$, respectively.

2. The method of claim 1, where demapping is hard bit level demapping;

where a 6 bit modulating data sequence consists of 3 in-phase modulating bits, namely the in-phase most significant bit $b_{I,MSB}$, the in-phase mid significant bit $b_{I,MidSB}$, and the in-phase least significant bit $b_{I,MSB}$, and of 3 quadrature modulating bits, namely the quadrature most significant bit $b_{I,MSB}$, the quadrature mid significant bit $b_{I,MidSB}$, and the quadrature least significant bit $b_{I,LSB}$;

where $b_{I,MSB}$ ($b_{Q,MSB}$) is the in-phase (quadrature) modulating bit that, in the square parent constellation, as it traverses parallel to the I (Q) axis from one end to the other, alternates in value once, $b_{I,MidSB}$ ($b_{Q,MidSB}$) is the in-phase (quadrature) modulating bit that, in the square parent constellation, as it traverses parallel to the I (Q) axis from one end to the other, alternates in value twice, and $b_{I,LSB}$ ($b_{Q,LSB}$) is the in-phase (quadrature) modulating bit that, in the square parent constellation, as it traverses parallel to the I (Q) axis from one to the other, alternates in value four times; and wherein said hard-bit values are given by:

$H_{I,MSB} = -1$, if $y_I > 0$
   $= +1$, otherwise; or
   $H_{I,MSB} = +1$, if $y_I > 0$
   $= -1$, otherwise $H_{I,MidSB} = -1$, if $|y_I| < 4$
   $= +1$, otherwise; or
   $H_{I,MidSB} = +1$, if $|y_I| < 4$
   $= -1$, otherwise;

$H_{I,LSB} = -1$, if $2 < |y_I| < 6$
   $= +1$, otherwise; or
   $H_{I,LSB} = +1$, if $2 < |y_I| < 6$
   $= -1$, otherwise; or $H_{Q,MSB} = -1$, if $y_Q > 0$
   $= +1$, otherwise; or
   $H_{Q,MSB} = +1$, if $y_Q > 0$
   $= -1$, otherwise $H_{Q,MidSB} = -1$, if $|y_I| < 8$, $|y_Q| < 4$
   $-1$, if $|y_I| < 2$, $|y_Q| > 8$
   $= +1$, otherwise; or
   $H_{Q,MidSB} = +1$, if $|y_I| < 8$, $|y_Q| < 4$
   $+1$, if $|y_I| < 2$, $|y_Q| > 8$
   $= +1$, otherwise $H_{Q,LSB} = -1$, if $2 < |y_Q| < 6$
   $= +1$, otherwise; or
   $H_{Q,LSB} = +1$, if $2 |y_Q < 6$
   $= +1$, otherwise;

where $H_{I,MSB}$, $H_{I,MidSB}$, and $H_{I,LSB}$ are the demapped hard bits for the in-phase modulating bits $b_{I,MSB}$, $b_{I,MidSB}$, and $b_{I,LSB}$ respectively; and where $H_{Q,MSB}, H_{Q,MidSB},$ and $H_{Q,LSB}$ respectively.

3. The method of claim 1, where demapping is soft bit level demapping;

where a 6 bit modulating data sequence consists of 3 in-phase modulating bits, namely the in-phase most significant bit $b_{I,MSB}$, the in-phase mid significant bit $b_{I,MidSB}$, and the in-phase least significant bit $b_{I,LSB}$, and of 3 quadrature modulating bits, namely the quadrature most significant bit $b_{I,MSB}$, the quadrature mid significant bit $b_{I,MidSB}$, and the quadrature least significant bit $b_{I,LSB}$;

where $b_{I,MSB}$ ($b_{Q,MSB}$) is the in-phase (quadrature) modulating bit that, in the square parent constellation, as it traverses parallel to the I (Q) axis from one end to the other, alternates in value once, $b_{I,MidSB}$ ($b_{Q,MidSB}$) is the in-phase (quadrature) modulating bit that, in the square parent constellation, as it traverses parallel to the I (Q) axis from one end to the other, alternates in value twice, and $b_{I,LSB}$ ($b_{Q,LSB}$) is the in-phase (quadrature) modulating bit that, in the square parent constellation, as it traverses parallel to the I (Q) axis from one to the other, alternates in value four times; and wherein said preliminary soft-bit values are given by;

$S_{I,MSB} = -y_I$; or
$S_{I,MSB} = +y_I$
$S_{I,MidSB} = |y_I|$; or
$S_{I,MidSB} = -|y_I| + 4$
$S_{I,LSB} = ||y_I| - 4| - 2 = |S_{I,MSB}| - 2$; or
$S_{I,LSB} = -||y_I| - 4| + 2 = -|S_{I,MSB}| + 2$
$S_{Q,MSB} = -y_Q$; or
$S_{Q,MidSB} = +y_Q$
$S_{Q,MidSB} = 2 - ||y_Q| - 6|, |y_I| < 2$
$= |y_Q| - 4, 2 \leq |y_I| < 8$
$S_{Q,MidSB} = -2 + ||y_Q| - 6|, |y_I| < 2$
$= -|y_Q| + 4, 2 \leq |y_I| < 8$
$= -|y_I| + 8, |y_I| \geq 8$
$S_{Q,LSB} = ||y_Q| - 4| - 2 = |D_{Q,2}| - 2$; or
$S_{Q,LSB} = -||y_Q| - 4| + 2 = -|D_{Q,2}| + 2$;

where $S_{I,MSB}$, $S_{I,MidSB}$, and $S_{I,LSB}$ are the preliminary soft-bits for the in-phase modulating bits $b_{I,MSB}$, $b_{I,MidSB}$, and $b_{I,LSB}$ respectively; and where $S_{Q,MSB}$, $S_{Q,MidSB}$, and $S_{Q,LSB}$ are the preliminary soft-bits for the quadrature modulating bits $b_{Q,MSB}$, $b_{Q,MidSB}$, and $b_{Q,LSB}$ respectively.

4. The method of claim 1, where demapping is soft bit level demapping;

where said received signal is a subcarrier of a multicarrier signal, including a DFT spread OFDM signal, and said preliminary soft-bits are multiplied by a factor that is a function of said received signal's signal-to-noise ratio (SNR), thereby creating final soft-bits.

5. The method of claim 1 wherein said received signal is a single carrier signal.

6. A method of hard bit level and soft bit level demapping in a receiver wherein a received signal was modulated in a transmitter by mapping a different 6 bit modulating data sequence to each of 64 constellation points to create a non-square, Gray coded, QAM signal point constellation, the method of hard bit level and soft bit level demapping comprising:

equalizing said received signal to remove channel distortion from said received signal thereby creating an equalized signal;

demodulating said equalized signal into an in-phase related symbol $y_I$ and a quadrature phase related symbol $y_Q$; and demapping said in-phase related symbol $y_I$ and said quadrature related symbol $y_Q$ into hard-bits or preliminary soft-bits by applying, for each of the 6 bits in the modulating sequence, a bit decision rule, the bit decision rule for a given bit determined by first partitioning the constellation plane into defined regions, where, in each region, the given bit value is either logical 1 or logical 0, then deducing the bit decision rule, where said bit decision rule is a function of the location of $y_I$ and or $y_Q$ in the given bit's partitioned constellation plane and declares a) whether the given bit is likely of value logical 1 or logical 0, and b) in the case of soft bit level demapping, the degree of confidence in the decision that the given bit is likely logical 1 or logical 0; and, optionally multiplying, in the case of soft bit level demapping, said preliminary soft-bits by a factor that is a function of said received signal's signal-to-noise ratio (SNR), thereby creating final soft-bits; and where the said non-square, Gray coded, QAM signal point constellation is the same as that created by modifying a square, Gray coded, QAM signal point parent constellation comprising 64 points, arranged with 16 points in each of four quadrants defined by I and Q axes intersecting at an origin of a phase-plane diagram, the signal points in each quadrant of the square array having I and Q relative component amplitudes of 1, 3, 5, and 7 units, the square, Gray coded, 64-QAM parent constellation being modified by eliminating an inner most 4 constellation points located at the complex positions $1+1j$, $-1+1j$, $-1-1j$ and $1-1j$, replacing the inner most 4 constellation points with new constellation points, located at $9+1j$, $-9+1j$, $-9-1j$ and $9-1j$, respectively, eliminating an outer most 4 constellation points, located at the complex positions $7+7j$, $-7+7j$, $-7-7j$ and $7-7j$, replacing the outer most 4 constellation points with new constellation points located at the complex positions $1+9j$, $-1+9j$, $-1-9j$ and $1-9j$, respectively.

7. The method of claim 6, where demapping is hard bit level demapping;

where a 6 bit modulating data sequence consists of 3 in-phase modulating bits, namely the in-phase most significant bit $b_{I,MSB}$, the in-phase mid significant bit $b_{I,MidSB}$, and the in-phase least significant bit $b_{I,LSB}$, and of 3 quadrature modulating bits, namely the quadrature most significant bit $b_{I,MSB}$, the quadrature mid significant bit $b_{I,MidSB}$, and the quadrature least significant bit $b_{I,LSB}$;

where $b_{I,MSB}$ ($b_{Q,MSB}$) is the in-phase (quadrature) modulating bit that, in the square parent constellation, as it traverses parallel to the I (Q) axis from one end to the other, alternates in value once, $b_{I,MidSB}$ ($b_{Q,MidSB}$) is the in-phase (quadrature) modulating bit that, in the square parent constellation, as it traverses parallel to the I (Q) axis from one end to the other, alternates in value twice, and $b_{I,LSB}$ ($b_{Q,LSB}$) is the in-phase (quadrature) modulating bit that, in the square parent constellation, as it traverses parallel to the I (Q) axis from one to the other, alternates in value four times; and wherein said hard-bit values are given by:

$H_{I,MSB} = -1$, if $y_I > 0$
$= +1$, otherwise; or
$H_{I,MSB} = +1$, if $y_I > 0$
$= -1$, otherwise
$H_{I,MidSB} = -1$, if $|y_Q| < 8, |y_I| < 4$
$= -1$, if $|y_Q| < 2, |y_I| > 8$
$= +1$, otherwise; or
$H_{I,MidSB} = +1$, if $|y_Q| < 8, |y_I| < 4$
$= +1$, if $|y_Q| < 2, |y_I| > 8$
$= -1$, otherwise; or
$H_{I,LSB} = -1$, if $2 < |y_I| < 6$
$= +1$, otherwise; or $H_{I,LSB}$=+1, if 2<|y_I|<6
=−1, otherwise
$H_{Q,MSB}$=−1, if $y_Q$>0
=+1, otherwise; or
$H_{Q,MSB}$=+1, if $y_Q$>0
=−1, otherwise; or
$H_{Q,MidSB}$=−1, if |y_Q|<4
=+1, otherwise; or
$H_{Q,MidSB}$=+1, if |y_Q|<4
=−1, otherwise
$H_{Q,LSB}$=−1, if 2<|y_Q|<6
=+1, otherwise; or
$H_{Q,LSB}$=+1, if 2<|y_Q|<6
=−1, otherwise:
  where $H_{I,MSB}$, $H_{I,MidSB}$, and $H_{I,LSB}$ are the demapped hard-bits for the in-phase modulating bits $b_{I,MSB}$, $b_{I,MidSB}$, and $b_{I,LSB}$ respectively; and
  where $H_{Q,MSB}$, $H_{Q,MidSB}$, and $H_{Q,LSB}$ are the demapped hard-bits for the quadrature modulating bits $b_{Q,MSB}$, $b_{Q,MidSB}$, and $b_{Q,LSB}$ respectively.

8. The method of claim 6, where demapping is soft bit level demapping;
  where a 6 bit modulating data sequence consists of 3 in-phase modulating bits, namely the in-phase most significant bit $b_{I,MSB}$, the in-phase mid significant bit $b_{I,MidSB}$, and the in-phase least significant bit $b_{I,LSB}$, and 3 quadrature modulating bits, namely the quadrature most significant bit $b_{I,MSB}$, the quadrature mid significant bit $b_{I,MidSB}$, and the quadrature least significant bit $b_{I,LSB}$;
  where $b_{I,MSB}$ ($b_{Q,MSB}$) is the in-phase (quadrature) modulating bit that, in the square parent constellation, as it traverses parallel to the I (Q) axis from one end to the other, alternates in value once, $b_{I,MidSB}$ ($b_{Q,MidSB}$) is the in-phase (quadrature) modulating bit that, in the square parent constellation, as it traverses parallel to the I (Q) axis from one end to the other, alternates in value twice, and $b_{I,LSB}$ ($b_{Q,LSB}$) is the in-phase (quadrature) modulating bit that, in the square parent constellation, as it traverses parallel to the I (Q) axis from one to the other, alternates in value four times; and
  wherein said preliminary soft-bit values are given by:
$S_{I,MSB}$=−$y_I$; or
$S_{I,MSB}$=+$y_I$
$S_{I,MidSB}$=2−||y_I|−6|, |y_Q|<2
=|y_I|−4, 2≤|y_Q|<8
=|y_Q|−8, |y_Q|≥8; or
$S_{I,MidSB}$=−2+||y_I|−6|, |y_Q|<2
=−|y_I|+4, 2≥|y_Q|<8
=−|y_Q|+8, |y_Q|≥8
$S_{I,LSB}$=||y_I|−4|−2=|$S_{I,MSB}$|−2; or
$S_{I,LSB}$=−||y_I|−4|+2=−|$S_{I,MSB}$|+2
$S_{Q,MSB}$=−$y_Q$; or
$S_{Q,MSB}$=+$y_Q$
$S_{Q,MidSB}$=|y_Q|−4; or
$S_{Q,MidSB}$=−|y_Q|+4
$S_{Q,LSB}$=||y_Q|−4|−2=|$D_{Q,2}$|−2; or
$S_{Q,LSB}$=−||y_Q|−4|+2=−|$D_{Q,2}$|+2
  where $S_{I,MSB}$, $S_{I,MidSB}$, and $S_{I,LSB}$ are the preliminary soft-bits for the in-phase modulating bits $b_{I,MSB}$, $b_{I,MidSB}$, and $b_{I,LSB}$ respectively; and
  where $S_{I,MSB}$, $S_{Q,MidSB}$, and $S_{Q,LSB}$ are the preliminary soft-bits for the quadrature modulating bits $b_{Q,MSB}$, $b_{Q,MidSB}$, and $b_{Q,LSB}$ respectively.

9. The method of claim 6, where demapping is soft bit level demapping;
  where said received signal is a subcarrier of a multicarrier signal, including a DFT spread OFDM signal, and said preliminary soft-bits are multiplied by a factor that is a function of said received signal's signal-to-noise ratio (SNR), thereby creating final-soft bits.

10. The method of claim 6 wherein said received signal is a single carrier signal.

11. A method of hard bit level and soft bit level demapping in a receiver wherein a received signal was modulated in a transmitter by mapping a different 8 bit modulating data sequence to each of 256 constellation points to create a non-square, Gray coded, QAM signal point constellation, the method of hard bit level and soft bit level demapping comprising:
  equalizing said received signal to remove channel distortion from said received signal thereby creating an equalized signal;
  demodulating said equalized signal into an in-phase related symbol $y_I$ and a quadrature phase related symbol $y_Q$; and
  demapping said in-phase related symbol $y_I$ and said quadrature related symbol $y_Q$ into hard-bits or preliminary soft-bits by applying, for each of the 8 bits in the modulating sequence, a bit decision rule, the bit decision rule for a given bit determined by first partitioning the constellation plane into defined regions, where, in each region, the given bit value is either logical 1 or logical 0, then deducing the bit decision rule, where said bit decision rule is a function of the location of $y_I$ and or $y_Q$ in the given bit's partitioned constellation plane and declares a) whether the given bit is likely of value logical 1 or logical 0, and b) in the case of soft bit level demapping, the degree of confidence in the decision that the given bit is likely logical 1 or logical 0; and
  optionally multiplying, in the case of soft bit level demapping, said preliminary soft-bits by a factor that is a function of said received signal's signal-to-noise ratio (SNR), thereby creating final soft-bits; and
  where the said non-square, Gray coded, QAM signal point constellation is the same as that created by modifying a square, Gray coded, QAM signal point parent constellation comprising 256 points, arranged with 64 points in each of four quadrants defined by I and Q axes intersecting at an origin of a phase-plane diagram, the signal points in each quadrant of the square array having I and Q relative component amplitudes of 1, 3, 5, 7,9,11,13 and 15 units, the square, Gray coded, 64-QAM parent constellation being modified by eliminating an inner most 16 constellation points located at the complex positions 1+3j, 3+3j, 1+1j, 3+1j, −1+3j, −3+3j, −1+1j, −3+1j, −1−3j, −3−3j, −1−1j, −3−1j, 1−3j, 3−3j, 1−1j and 3−1j, replacing the inner most 16 constellation points with new constellation points, located at complex positions 1+19j, 3+19j, 1+17j, 3+17j, −1+19j, −3+19j, −1+17j, −3+17j, −1−19j, −3−19j, −1−17j, −3−17j, 1−19j, 3−19j, 1−17j and 3−17j, respectively, eliminating an outer most 16 constellation points, located at the complex positions 13+15j, 15+15j, 13+13j, 15+13j, −13+15j, −15+15j, −13+13j, −15+13j, −13−15j, −15−15j, −13−13j, −15−13j, 13−15j, 15−15j, 13−13j and 15−13j, replacing the outer most 16 constellation points with new constellation points located at the complex positions 19+1j, 17+1j, 19+3j, 17+3j, −19+1j, −17+1j, −19+3j, −17+3j, −19−1j, −17−1j, −19−3j, −17−3j, 19−1j, 17−1j, 19−3j and 17−3j, respectively.

12. The method of claim 11, where demapping is soft bit level demapping;
  where said received signal is a subcarrier of a multicarrier signal, including a DFT spread OFDM signal, and said preliminary soft-bits are multiplied by a factor that is a function of said received signal's signal-to-noise ratio (SNR), thereby creating final soft-bits.

13. The method of claim 11 wherein said received signal is a single carrier signal.

14. A method of hard bit level and soft bit level demapping in a receiver wherein a received signal was modulated in a transmitter by mapping a different 8 bit modulating data sequence to each of 256 constellation points to create a non-square, Gray coded, QAM signal point constellation, the method of hard bit level and soft bit level demapping comprising:

equalizing said received signal to remove channel distortion from said received signal thereby creating an equalized signal;

demodulating said equalized signal into an in-phase related symbol $y_I$ and a quadrature phase related symbol $y_Q$; and demapping said in-phase related symbol $y_I$ and said quadrature related symbol $y_Q$ into hard-bits or preliminary soft-bits by applying, for each of the 8 bits in the modulating sequence, a bit decision rule, the bit decision rule for a given bit determined by first partitioning the constellation plane into defined regions, where, in each region, the given bit value is either logical 1 or logical 0, then deducing the bit decision rule, where said bit decision rule is a function of the location of $y_I$ and or $y_Q$ in the given bit's partitioned constellation plane and declares a) whether the given bit is likely of value logical 1 or logical 0, and b) in the case of soft bit level demapping, the degree of confidence in the decision that the given bit is likely logical 1 or logical 0; and optionally multiplying, in the case of soft bit level demapping, said preliminary soft-bits by a factor that is a function of said received signal's signal-to-noise ratio (SNR), thereby creating final soft-bits; and where the said non-square, Gray coded, QAM signal point constellation is the same as that created by modifying a square, Gray coded, QAM signal point parent constellation comprising 256 points, arranged with 64 points in each of four quadrants defined by I and Q axes intersecting at an origin of a phase-plane diagram, the signal points in each quadrant of the square array having I and Q relative component amplitudes of 1, 3, 5, 7,9,11,13 and 15 units, the square, Gray coded, 64-QAM parent constellation being modified by eliminating an inner most 16 constellation points located at the complex positions 1+3*j*, 3+3*j*, 1+1*j*, 3+1*j*, −1+3*j*, −3+3*j*, −1+1*j*, −3+1*j*, −1−3*j*, −3−3*j*, −1−1*j*, −3−1*j*, 1−3*j*, 3−3*j*, 1−1*j* and 3−1*j*, replacing the inner most 16 constellation points with new constellation points, located at complex positions 17+3*j*, 19+3*j*, 17+1*j*, 19+1*j*, −17+3*j*, −19+3*j*, −17+1*j*, −19+1*j*, −17−3*j*, −19−3*j*, −17−1*j*, −19−1*j*, 17−3*j*, 19−3*j*, 17−1*j* and 19−1*j*, respectively, eliminating an outer most 16 constellation points, located at the complex positions 13+15*j*, 15+15*j*, 13+13*j*, 15+13*j*, −13+15*j*, −15+15*j*, −13+13*j*, −15+13*j*, −13−15*j*, −15−15*j*, −13−13*j*, −15−13*j*, 13−15*j*, 15−15*j*, 13−13*j* and 15−13*j*, replacing the outer most 16 constellation points with new constellation points located at the complex positions 3+17*j*, 1+17*j*, 3+19*j*, 1+19*j*, −3+17*j*, −1+17*j*, −3+19*j*, −1+19*j*, −3−17*j*, −1−17*j*, −3−19*j*, −1−19*j*, 3−17*j*, 1−17*j*, 3−19*j* and 1−19*j*, respectively.

15. The method of claim 14, where demapping is soft bit level demapping;

where said received signal is a subcarrier of a multicarrier signal, including a DFT spread OFDM signal, and said preliminary soft-bits are multiplied by a factor that is a function of said received signal's signal-to-noise ratio (SNR), thereby creating final soft-bits.

16. The method of claim 14 wherein said received signal is a single carrier signal.

* * * * *